US010264734B2

(12) United States Patent
Birkhofer

(10) Patent No.: US 10,264,734 B2
(45) Date of Patent: Apr. 23, 2019

(54) CHOPPING DRUM FOR A FIELD CHOPPER

(71) Applicant: CLAAS Saulgau GmbH, Bad Saulgau (DE)

(72) Inventor: Stefan Birkhofer, Stockach (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 0 days.

(21) Appl. No.: 15/630,435

(22) Filed: Jun. 22, 2017

(65) Prior Publication Data

US 2018/0007835 A1    Jan. 11, 2018

(30) Foreign Application Priority Data

Jul. 8, 2016  (DE) .......................... 10 2016 112 577

(51) Int. Cl.
*A01F 29/09*  (2010.01)
*A01F 29/06*  (2006.01)
*A01F 11/06*  (2006.01)

(52) U.S. Cl.
CPC ............ *A01F 29/095* (2013.01); *A01F 11/06* (2013.01); *A01F 29/06* (2013.01)

(58) Field of Classification Search
CPC ....... A01F 29/095; A01F 29/06; A01D 43/08; A01D 43/088; B27G 13/04

USPC .............................................. 241/292.1, 294
See application file for complete search history.

(56) References Cited

U.S. PATENT DOCUMENTS

| | | | | |
|---|---|---|---|---|
| 74,333 A * | 2/1868 | Fletcher | ................. | B27G 13/04 144/230 |
| 302,380 A * | 7/1884 | Boyle | .................... | B27G 13/04 144/225 |
| 4,257,566 A * | 3/1981 | Lawrence | ............ | B02C 18/186 241/221 |
| 4,714,204 A * | 12/1987 | John | ..................... | A01F 29/095 144/172 |
| 7,213,781 B2 * | 5/2007 | Pakura | ................... | A01D 43/08 241/221 |

FOREIGN PATENT DOCUMENTS

DE         2552876 A1 *   6/1977  ............ B27G 13/04

* cited by examiner

*Primary Examiner* — Alicia Torres

(57) ABSTRACT

Chopping drum (10) for a field chopper, having a drum body (11), having a blade carrier (12) and having a plurality of blades (13) which are fastened to the blade carrier (12), each blade (13) being fastened to the blade carrier (12) via at least two fasteners (14) which extend through a fastening section (15) of the respective blade (13) into the blade carrier (12), and the fasteners (14) penetrating the fastening section (15) of the respective blade (13) at an angle of between 40° and 70°.

14 Claims, 2 Drawing Sheets

CHOPPING DRUM FOR A FIELD CHOPPER

Figure 1:
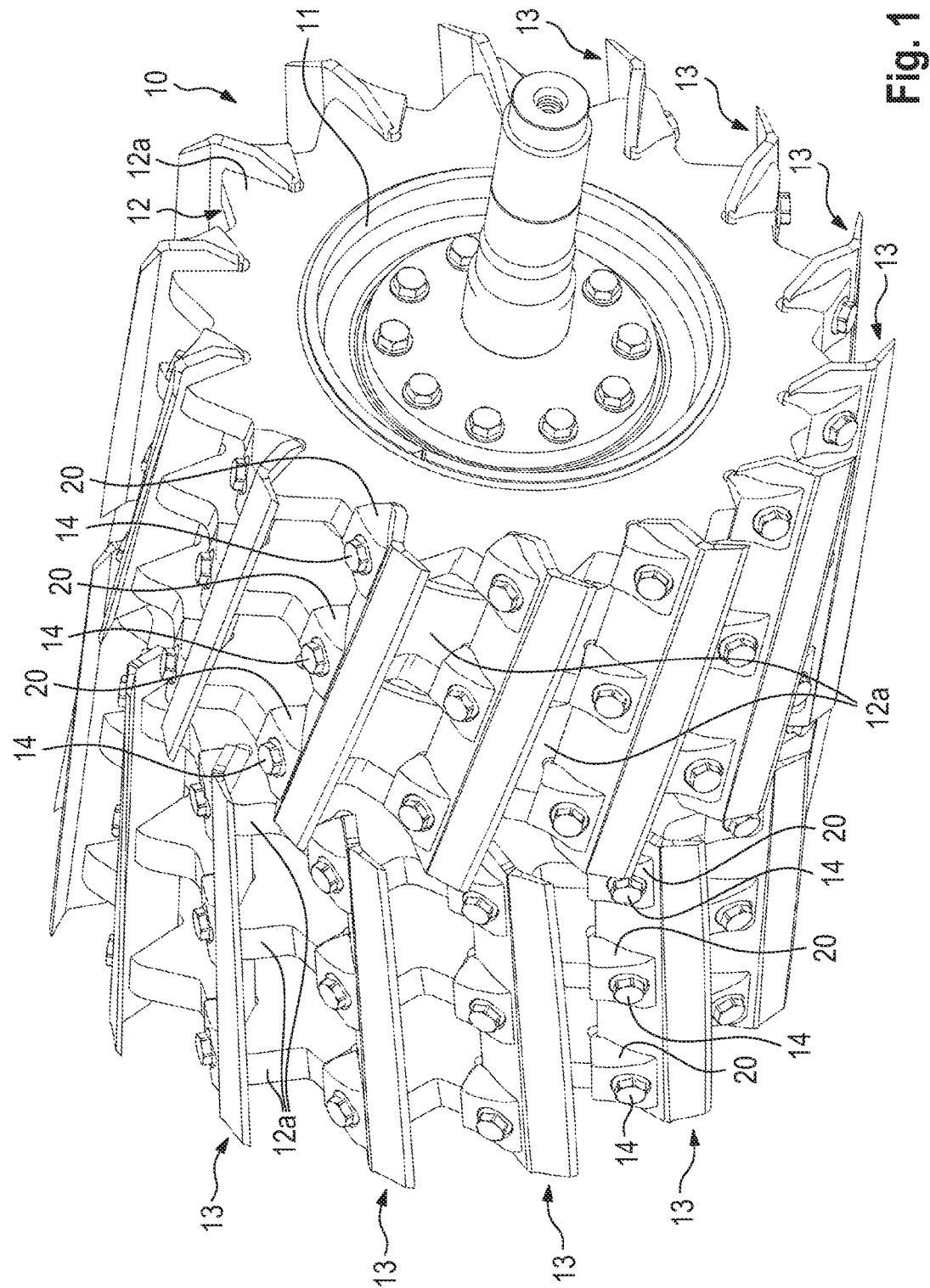

The invention relates to a chopping drum for a field chopper.

In agricultural harvesters, a distinction is fundamentally made between harvesters of the type in which the harvesting material is threshed, and between harvesters of the type in which the harvesting material is chopped.

Harvesters which are configured as combine harvesters are typically used when a cereal such as wheat, barley or oats is to be harvested as harvesting material or rape is to be harvested as harvesting material.

Field choppers are typically used as harvesters, in contrast, when maize is to be harvested as harvesting material or sorghum is to be harvested as harvesting material.

A harvester which is configured as a combine harvester and in which a harvesting material to be harvested is threshed has an attachment with a plurality of mowing members which harvest the harvesting material while carrying out a scissor-like separating cut. In contrast, a harvester which is configured as a field chopper has an attachment which is configured as a corn picker head with a plurality of mowing and intake members which are driven in a circulating manner.

A harvester which is configured as a field chopper has, as viewed in the transport direction of the harvesting material, a chopping unit which is positioned downstream of the attachment, in order to chop the harvested harvesting material. Here, the chopping unit has a chopping drum which comprises a drum body, a blade carrier and a plurality of blades which are fastened to the blade carrier.

DE 10 2012 023 431 A1 has disclosed a chopping drum for a field chopper. According to the said prior art, the blade carrier is mounted on the drum body as a separate assembly, namely a plurality of blade carrier rings of the blade carrier which are segmented in the circumferential direction and are spaced apart axially.

In the case of chopping drums which are known from practice, the blades are fastened to the blade carrier of the chopping drum via a plurality of fastening means which extend through a fastening section of the respective blade into the blade carrier. Here, the fastening means penetrate the fastening section of the respective blade at an angle of 90°. Accordingly, a longitudinal axis of the fastening bolts runs perpendicularly with respect to the fastening section of the respective blade.

Fastening of this type of the blades to the blade carrier has the disadvantage that the number of blades which can be fastened to the drum body is limited. The reason for this is, inter alia, that the fastening means are accessible only with difficulty when they penetrate the fastening section of the respective blade at an angle of 90°. Furthermore, the fastening means lie in the material flow when the fastening means penetrate the fastening section of the respective blade at an angle of 90°.

Proceeding from this, the invention is based on the object of providing a novel chopping drum for a field chopper, in the case of which novel chopping drum a multiplicity of blades can be mounted with high security on the blade carrier, with satisfactory accessibility of the fastening means.

The said object is achieved by way of the chopping drum according to claim 1. According to the invention, the fastening means penetrate the fastening section of the respective blade at an angle of between 40° and 70°. The invention proposes for the first time that the fastening means do not penetrate the fastening section of the respective blade at an angle of 90°, but rather at an angle of between 40° and 70°. As a result, the number of blades which can be mounted on the chopping drum can be increased with satisfactory accessibility of the fastening means. Furthermore, the blades can be mounted on the blade carrier with high security.

Each blade preferably has a cutting section which is angled away with respect to the respective fastening section, the fastening section and the cutting section of the respective blade enclosing an angle of between 125° and 155°. In this way, the accessibility of the fastening means and therefore the number of blades which can be fastened to the drum body can be increased further.

According to one advantageous development of the invention, a clamping piece is arranged between the fastening section of the respective blade and the respective fastening means. The respective clamping piece is preferably contoured in a wedge-shaped manner. Clamping pieces of this type are advantageous for increasing the fastening security. The blades can be fastened securely to the blade carrier with a high clamping force. The wedge shape of the clamping piece ensures an increased clamping force, provides an anti-rotation safeguard and makes precise positioning possible.

According to one advantageous development of the invention, the respective clamping piece has a rear face, with which the respective clamping piece bears against the blade carrier, a clamping face, with which the respective clamping piece bears against the fastening section of the respective blade, and a seat face, against which a bolt head of the respective fastening means which is configured as a fastening bolt bears. Via the rear face, the respective clamping piece can be oriented on the blade carrier in a defined manner. The seat face provides a defined bearing face for the bolt head of the respective fastening means. The clamping face runs parallel to a corresponding surface of the fastening section of the respective blade and applies the clamping force in a defined manner to the respective fastening section of the respective blade.

The respective clamping piece preferably has a lug in a transition region between the rear face and the clamping face, against which lug the fastening section of the respective blade bears in order to orient the respective blade. Via the lug which interacts with one end of the fastening section of the respective blade, the respective blade can be oriented in a defined manner on the blade carrier and therefore on the chopping drum.

Figure 2:
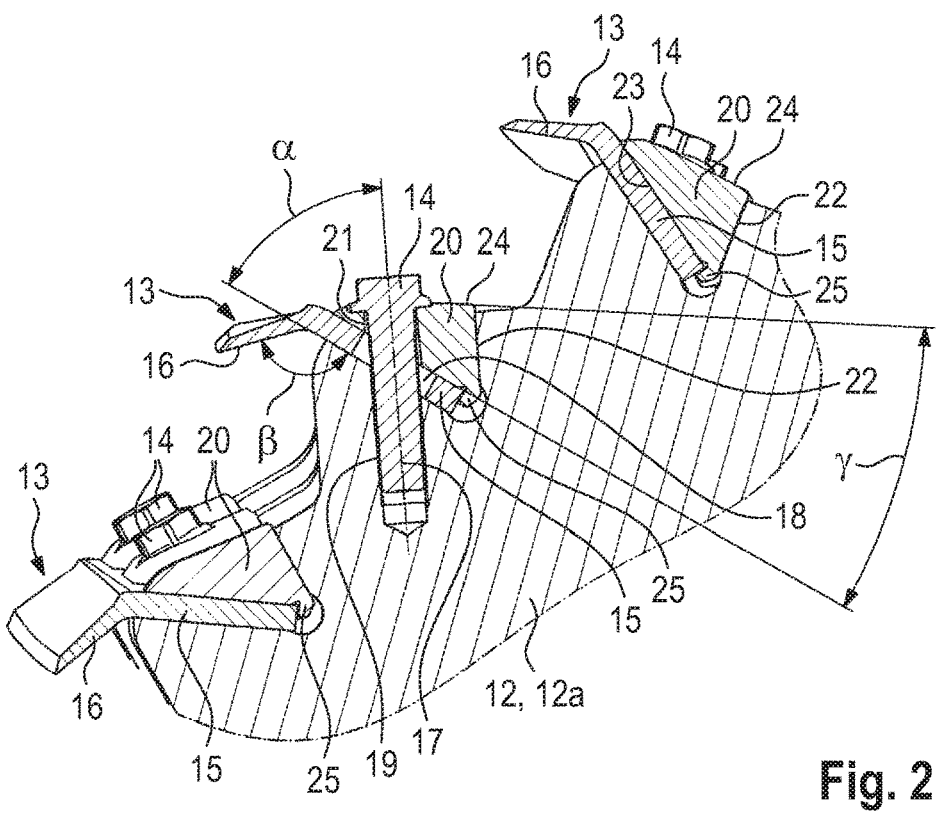
Figure 3:
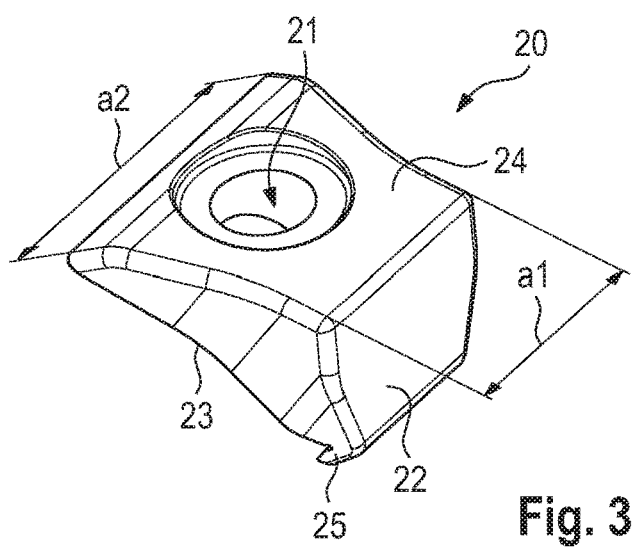

Preferred developments of the invention result from the subclaims and the following description. Without being restricted hereto, exemplary embodiments of the invention will be explained in greater detail using the drawing, in which:

FIG. 1 shows a perspective view of a chopping drum according to the invention for a field chopper, FIG. 2 shows details of a cross section through the chopping drum according to the invention, and FIG. 3 shows a perspective view of a clamping piece of the chopping drum according to the invention.

The present invention relates to a chopping drum for a field chopper. A chopping drum of this type is a constituent part of a chopping unit of the field chopper, the chopping unit being arranged downstream of an attachment of the field chopper as viewed in the material flow direction of the harvesting material.

FIG. 1 shows a perspective view of a chopping drum 10 for a field chopper. The chopping drum 10 has a drum body 11 which is mounted rotatably on a housing of a chopping unit (not shown).

Furthermore, the chopping drum 11 has a blade carrier 12 and a plurality of blades 13 which are fastened to the blade carrier 12.

According to FIG. 1, in the exemplary embodiment which is shown, two groups comprising in each case a plurality of blades 13 which are fastened to the drum body 11 via the blade carrier 12 behind one another in the circumferential direction are mounted on the blade carrier 12, the blades 13 within each group of blades being positioned obliquely at the same angle with respect to the axial direction. Here, the two groups of blades 13 are arranged behind one another in the axial direction, the oblique position of the blades of the two groups being in opposite directions to one another in such a way that axes of the blades 13 of the two groups intersect when projected.

Each blade 13 is fastened to the blade carrier 12 via in each case at least two, preferably in each case at least three, fastening means 14, the fastening means 14 being configured as fastening bolts. Here, the fastening means 14 extend through the respective blade into the blade carrier 12, the blade carrier 12 having, for each blade 13, at least two, preferably three, fastening sections which interact with the respective fastening means 14 of the respective blade 13.

In the exemplary embodiment which is shown, the blade carrier 12 is formed by blade carrier rings 12a which are arranged next to one another at a spacing as viewed in the axial direction of the chopping drum 10 and are circumferential in a closed manner as viewed in the circumferential direction. In the exemplary embodiment which is shown, the blade carrier 12 has three blade carrier rings 12a for each group of blades 13, to which blade carrier rings 12a each blade 13 of the respective group is fastened via the fastening means 14. Accordingly, each blade carrier ring 12a which is circumferential in a closed manner in the circumferential direction provides fastening sections for all blades 13 of the respective group of blades 13, which fastening sections interact with the respective fastening means 14. In the exemplary embodiment which is shown, in which two groups of in each case a plurality of blades 13 which are positioned behind one another in the circumferential direction are fastened to the drum body 11 via the blade carrier 12, the blade carrier 12 accordingly has six blade carrier rings 12a which are spaced apart axially. In each case three blade carrier rings 12a serve to fasten the blades 13 of one group of blades 13.

In contrast to blade carrier rings which are circumferential in a closed manner in the circumferential direction, blade carrier rings 12a which are segmented in the circumferential direction can also be used. Blade carrier rings 12a of this type which are segmented in the circumferential direction are known from DE 10 2012 023 431 A1.

The blade carrier rings 12a are configured in each case as separate assemblies and are mounted on the drum body 11. In contrast to this, the blade carrier 12 can also be an integral constituent part of the drum body 11. In this case, threaded bores 19, into which the fastening means 14 engage, can then be made directly in the drum body 11.

Each blade 13 has a fastening section 15 and a cutting section 16, the fastening section 15 of the respective blade 13 serving to fasten the respective blade 13 to the blade carrier 12, and the respective cutting section of the respective blade 13 serving to chop the harvesting material. As can be best gathered from FIG. 2, the cutting section 16 of the respective blade 13 is angled away with respect to the fastening section 15 of the respective blade 13, to be precise downwards as viewed in the rotational direction of the chopping drum 10.

As has already been stated, the fastening section 15 of the respective blade 13 serves to fasten the respective blade 13 to the blade carrier 12 with the aid of at least two, preferably three, fastening means 14, each fastening means 14 extending, in the region of the respective blade 13, through the respective fastening section 15 of the respective blade 13 into the blade carrier 12 or the respective blade carrier ring 12a of the blade carrier 12.

The fastening means 14 penetrate the fastening section 15 of the respective blade 13 at an angle α between 40° and 70°. A longitudinal centre axis 17 of the respective fastening means 14 which is preferably configured as a fastening bolt accordingly encloses the angle of between 40° and 70° with the fastening section 15 of the respective blade 13.

Here, the respective fastening means 14 which is preferably configured as a fastening bolt penetrates a through hole 18 in the fastening section 15 of the respective blade 13 and engages into a threaded bore 19 in the blade carrier 12 or in the respective blade carrier ring 12a of the blade carrier 12 of the chopping drum 10.

In the region of each blade 13, the fastening means 14 preferably penetrate the respective fastening section 15 at an angle of between 45° and 65°, in particular at an angle of between 50° and 60°. In the exemplary embodiment which is shown, the angle α, at which the fastening means 14 penetrate the fastening section 13 of the respective blade 13, is 55°.

The above oblique position of the fastening means 14 with respect to the fastening section 15 of the respective blade 13 makes it possible to fasten a multiplicity of blades 13 behind one another on the circumference of the drum body 11 with satisfactory accessibility of the fastening means 14.

As has already been stated, the respective cutting section 16 of the respective blade 13 is angled away with respect to the respective fastening section 15 of the respective blade 13, a section 16 and a fastening section 15 enclosing an angle β of between 125° and 155°. The angle β between the fastening section 15 and the cutting section 16 of the respective blade 13 is preferably between 130° and 150°, in particular between 120° and 130°. This also ensures satisfactory accessibility of the fastening means 14, even in the case of a high number of blades 13 which are mounted behind one another on the circumference of the drum body 11. The fastening means 14, via which the blades 13 are fastened to the blade carrier 12 or the blade carrier rings 12a, are positioned outside a material flow downstream of the cutting sections 16 of the blades 13.

Here, in the preferred exemplary embodiment which is shown, the fastening means 14 interact with clamping pieces 20. Each fastening bolt 14 interacts with a clamping piece 20 in such a way that the respective clamping piece 20 is arranged between the fastening section 15 of the respective blade 13 and the respective fastening means 14. The clamping piece 20 transmits the clamping force of the respective fastening means 14 to the fastening section 15 of the respective blade 13.

As can best be gathered from FIG. 2, the respective clamping piece 20 is contoured in a wedge-shaped manner. The said clamping piece 20 has a through hole for the respective fastening means 14 which is preferably configured as a fastening bolt, the through hole 21 of the respective clamping piece 20 being flush with the respective through hole 18 of the fastening section 15 of the respective blade 13, with the result that, for fastening of the respective blade 13 to the blade carrier 12 or to the respective blade carrier ring 12a, the respective fastening means 14 penetrates both the through hole 21 of the clamping piece 20 and the through hole 18 of the fastening section 15 of the respective blade 13.

As has already been stated, the respective clamping piece 20 is contoured in a wedge-shaped manner. The respective clamping piece 20 has a rear face 22, with which, in the mounted state, the respective clamping piece 20 bears against the blade carrier 12 or against the respective blade carrier ring 12a of the blade carrier 12. In addition, the respective clamping piece 20 has a clamping face 23, with which the respective clamping piece 20 bears against the fastening section 15 of the respective blade 13. Moreover, the respective clamping piece 20 provides a seat face 24 for a bolt head of the respective fastening means 14 which is configured as a fastening bolt. Accordingly, the bolt head of the respective fastening means 14 comes into contact with the seat face 24 of the respective clamping piece 20.

The abovementioned faces of the clamping piece 20, namely the rear face 22, the clamping face 23 and the seat face 24, define a type of triangle as viewed in cross section, the seat face 24 and the clamping face 23 tapering or converging acutely towards one another starting from the rear face 22 and in the process enclosing an angle γ which is between 20° and 50°. In particular, the angle γ which is enclosed by the clamping face 23 and the seat face 24 is between 25° and 45°, preferably between 30° and 40°.

The above-defined angular ranges α, β and γ, that is to say the angular range α, with which the fastening means are positioned obliquely with respect to the fastening section 15 of the respective blade 13, the angle β which is enclosed by the fastening section 15 and the cutting section of the respective blade 13, and the angle γ which is enclosed by the clamping face 23 and the seat face 24 of the respective clamping piece ensure, in particular in interaction, firstly a particularly advantageous application of a clamping force to the respective fastening section 15 of the respective blade 13 for fastening the respective blade 13 to the blade carrier 12, and secondly an optimum introduction of forces which act on the cutting sections 16 of the blades 13 during operation via the fastening means 14 into the blade carrier 12, the fastening means 14 being subjected here almost exclusively to tensile loading. Furthermore, a multiplicity of blades 13 can be mounted behind one another on the circumference of the drum body 11 with satisfactory accessibility of the fastening means 14.

Not only can a defined clamping force be applied to the blades 13, namely to the fastening sections 15 thereof, but cutting forces can also be introduced in an optimum manner into the blade carrier 12 and flexural loads of the bolt heads of the fastening means 14 which are configured as fastening bolts can be reduced.

As has already been stated, the fastening means 14 are arranged outside the material flow downstream of the cutting sections 16 of the blades 13 as viewed in the material flow direction. The same applies to the clamping pieces 20 which interact with the fastening means 14.

As has been stated above, the respective rear face 22 of the respective clamping piece 20 comes into contact with the blade carrier 12 or with the respective blade carrier ring 12a, as a result of which the clamping piece 20 can be oriented relative to the blade carrier 12. The respective clamping piece 20 has a lug 25 in a transition region between the rear face 22 and the clamping face 23, with which the fastening section 15 of the respective blade 13 comes into contact by way of an end which faces away from the respective cutting section 16 of the respective blade 13. Here, the said lug 25 of the clamping piece 20 serves to orient the respective blade 13 on the blade carrier 12 and therefore on the drum body 11 of the chopping drum 10. Complicated setting work for positioning the blades 13 on the drum body or blade carrier can thus be dispensed with.

As can be gathered from FIG. 3, the respective clamping piece 20 has, in the region of its rear face 22, an axial extent a1 which is smaller than the axial extent a2 on a section of the clamping body 20 which lies opposite the rear face 22 and in the region of which the supporting face 24 and the clamping face 23 taper towards one another acutely. The clamping piece 20 is preferably tapered convexly inwards between the said ends of the clamping piece 20 which lie opposite one another with the axial extents a1 and a2 which differ from one another. As a result, they can be of lighter configuration, that is to say can have a lighter weight; furthermore, this is advantageous for an optimum introduction of the clamping force in the direction of the fastening section 15 of the respective blade 13.

In addition to the aperture 21 for the respective fastening means 14, further cut-outs (not shown) can be made in the clamping body 20, in order to ensure a defined elastic deformability of the respective clamping piece 20. This also has advantages for a defined introduction of the clamping force into the respective fastening section 15 of the respective blade 13.

Due to the fact that, in the case of the chopping drum 10 according to the invention, the fastening means 14 penetrate the fastening section 15 of the respective blades 13 at the defined angle α which is between 40° and 70°, a multiplicity of dividing blades 13 can be arranged at a small spacing on the circumference of the chopping drum 10 with satisfactory accessibility of the fastening means 14. Here, the fastening means are arranged outside the material flow, to be precise downstream of the cutting sections 16 of the blades 13. The wedge-shaped clamping pieces 20 are preferably used during the fastening of the blades 13 to the blade carrier 12 or to the blade carrier rings 12a, a clamping piece 20 of this type interacting with each fastening means 14. Via the clamping pieces 20, a clamping force which is applied by the fastening means can be transmitted in an optimum manner to the fastening section 15 of the respective blade; furthermore, forces which act on the cutting sections 16 of the dividing blades 13 during operation can be introduced into the blade carrier 12 in an optimum manner. Accordingly, a multiplicity of blades can be fastened with high security to the blade carrier 12, with satisfactory accessibility of the fastening means 14.

In the case of damage to fastening means 14, the respective clamping pieces 20 absorb forces and thus protect the blade carrier 12 against damage.

The lug 25 which is configured on the respective clamping piece 20 permits precise positioning of the blades 13 on the blade carrier 12 without complicated setting work.

Since the fastening means 14 lie downstream of the cutting section 16 of the respective blade 13, the said fastening means 14 are arranged outside the material flow and are satisfactorily accessible for mounting work. The material flow of the harvesting material and a material diversion of the said harvesting material are not impeded by the fastening means 14. A high harvesting material throughput can be realized.

The blades 13 can be mounted and replaced simply. The fastening means 14 penetrate the fastening section 15 of the respective blade 13 and thus provide an additional protection against loss.

LIST OF REFERENCE NUMERALS

10 Chopping drum
11 Drum body

12 Blade carrier
12a Blade carrier ring
13 Blade
14 Fastening means
15 Fastening section
16 Cutting section
17 Longitudinal centre axis
18 Through hole
19 Threaded bore
20 Clamping piece
21 Through hole
22 Rear face
23 Clamping face
24 Seat face
25 Lug

The invention claimed is:

1. Chopping drum (10) for a field chopper comprising:
a drum body (11);
a blade carrier (12);
a plurality of blades (13) fastened to the blade carrier (12), each of the plurality of blades (13) being fastened to the blade carrier (12) via at least two fasteners (14) that extend through a fastening section (15) of the blades (13) into the blade carrier (12); and
a clamping piece (20) disposed between the fastening section (15) of a respective one of the plurality of blades (13) and the respective fasteners (14), the clamping piece having a rear face (22) disposed against the blade carrier (12), a clamping face (23) disposed against the fastening section (15) of the respective blade (12), and a seat face (24) against which a bolt head of the respective fastener (14) is disposed.

2. The chopping drum according to claim 1, wherein the fasteners (14) penetrate the fastening section (15) of the respective blade (13) at an angle of between 40° and 70°.

3. The chopping drum according to claim 2, wherein the fasteners (14) penetrate the fastening section (15) of the respective blade (13) at an angle of between 45° and 65°, in particular at an angle of between 50° and 60°.

4. The chopping drum according to claim 1, wherein each blade (13) has a cutting section (16) which is angled away with respect to the respective fastening section (15), the fastening section (15) and the cutting section (16) of the respective blade enclosing an angle of between 125° and 155°.

5. The chopping drum according to claim 4, wherein the fastening section (15) and the cutting section (16) of the respective blade enclose an angle of between 130° and 150°.

6. The chopping drum according to claim 1, wherein the respective clamping piece (20) is contoured in a wedge-shaped manner.

7. The chopping drum according to claim 1, wherein the respective clamping piece (20) has a through hole (21) for the respective fastener (14).

8. The chopping drum according to claim 1, wherein the respective clamping piece (20) has recesses and/or is tapered.

9. The chopping drum according to claim 1, wherein the clamping face (23) and the seat face (24) enclose an angle of between 20° and 50°.

10. The chopping drum according to claim 1, wherein the clamping face (23) and the seat face (24) enclose an angle of between 25° and 45°, in particular an angle of between 30° and 40°.

11. The chopping drum according to claim 1, wherein the respective clamping piece (20) has a lug (25) in a transition region between the rear face (22) and the clamping face (23), against which lug (25) the fastening section (15) of the respective blade (13) bears in order to orient the respective blade (13).

12. The chopping drum according to claim 1, wherein the blade carrier (12) is an integral constituent part of the drum body (11).

13. The chopping drum according to claim 1, wherein the blade carrier (12) is mounted on the drum body (11) as a separate assembly which comprises a plurality of blade carrier rings (12a).

14. The chopping drum according to claim 1, wherein the respective fastener (14) is positioned outside a material flow downstream of a cutting section (15) of the respective blade (13).

* * * * *